US006672564B2

(12) United States Patent
Johann et al.

(10) Patent No.: US 6,672,564 B2
(45) Date of Patent: Jan. 6, 2004

(54) DRIVE DEVICE

(75) Inventors: Hans-Jürgen Johann, Friedrichsdorf (DE); Peter Welteroth, Eitorf (DE); Armin Seeger, Bad Soden/Ts. (DE)

(73) Assignee: Siemens Aktiengesellschaft, München (DE)

( * ) Notice: Subject to any disclaimer, the term of this patent is extended or adjusted under 35 U.S.C. 154(b) by 61 days.

(21) Appl. No.: 10/153,557

(22) Filed: May 21, 2002

(65) Prior Publication Data

US 2003/0005909 A1 Jan. 9, 2003

(30) Foreign Application Priority Data

May 31, 2001 (DE) ........................................ 101 26 471

(51) Int. Cl.[7] ................................................ F16K 51/00
(52) U.S. Cl. ........................................ 251/286; 251/305
(58) Field of Search ................................ 251/286, 287, 251/288, 305, 248

(56) References Cited

U.S. PATENT DOCUMENTS

| | | | | |
|---|---|---|---|---|
| 3,918,318 A | | 11/1975 | Phillips | |
| 4,200,596 A | * | 4/1980 | Iiyama et al. | 261/65 |
| 6,039,027 A | * | 3/2000 | Sato et al. | 123/399 |

FOREIGN PATENT DOCUMENTS

| | | |
|---|---|---|
| DE | 3918852 | 12/1990 |
| DE | 19622141 | 12/1997 |
| DE | 19728480 | 1/1998 |
| DE | 19855892 | 6/1999 |
| FR | 2381449 | 9/1978 |

* cited by examiner

*Primary Examiner*—John Bastianelli
(74) *Attorney, Agent, or Firm*—Martin A. Farber

(57) ABSTRACT

A drive device (10, 100) with an actuating drive (40, 130) for driving a movable element (11, 110), in which drive device a lever (62, 144) coupled to the movable element (11, 110) is capable of being driven by the actuating drive (40, 130) via a gear (48, 132), the lever (62, 144) being capable of being acted upon by a firmly supported return spring (34, 164) so as to be capable of being pivoted back into a basic position (82, 161), and, in the basic position (82, 161), a first lever arm (64, 146) of the lever (62, 144) being acted upon by a stop (84, 160), is to have a particularly low space requirement and at the same time absorb momentum energy of the gear (48, 132) in a particularly reliable way in the event of a failure of the actuating drive (40, 130). For this, the first lever arm (64, 146) of the lever (62, 144) is subdivided by a clearance (68, 150) into a first part region (70, 152) and a second part region (72, 154), the first part region (70, 152) and the second part region (72, 152) each having a free end (74, 76, 156, 158), and at least the free end (76, 158) of the second part region (72, 154) being deformed in the direction of the free end (74, 156) of the first part region (70, 152).

10 Claims, 9 Drawing Sheets

DRIVE DEVICE

FIELD AND BACKGROUND OF THE INVENTION

The invention relates to a drive device with an actuating drive for driving a movable element, in which drive device a lever coupled to the movable element is capable of being driven by the actuating drive via a gear, the lever being acted upon by a firmly supported return spring so as to be capable of being pivoted back into a basic position, and, in the basic position, one lever arm of the lever being acted upon by a stop.

Internal combustion engines of motor vehicles conventionally have a suction pipe, via which fresh air is capable of being supplied to the internal combustion engine. To regulate the quantity of fresh gas to be supplied to the internal combustion engine, the respective suction pipe conventionally has a number of valves, via which the air quantity passing through the suction pipe is capable of being influenced. The suction pipe valves are conventionally activated by an electric motor via a linkage. In this case, for a proper functioning of the internal combustion engine, it is necessary for the suction pipe valves also to be capable of being pivoted in a predetermined way through particularly small angular ranges. Even in the event of a failure of the electric motor driving the suction pipe valves, a return spring in this case ensures that the suction pipe valves are not closed, but are opened in such a way that a defined predetermined power output of the internal combustion engine is reliably ensured. Drive devices of this type for adjusting suction pipe valves of suction pipes of motor vehicles conventionally require a particularly large amount of space, since, in the event of a failure of the servomotor driving the suction pipe valves, excess energy has to be absorbed by the return spring which adjusts the suction pipe valves into a predetermined open position. The high space requirement of these drive devices proves to be a disadvantage, since, for example, electronics have recently needed an increasingly larger space in the engine compartment and only a limited amount of space is available in the engine compartment.

SUMMARY OF THE INVENTION

The object on which the invention is based is, therefore, to specify a drive device of the abovementioned type, which requires a particularly small amount of space and which, even in the event of a failure of the actuating drive, reliably ensures an absorption of excess energy of the return spring.

This object is achieved, according to the invention, in that the lever arm is subdivided by a clearance into a first part region and a second part region, the first part region and the second part region each having a free end, and at least the free end of the second part region being deformed in the direction of the free end of the first part region.

The invention proceeds, in this context, from the notion that, in the event of a failure of the actuating drive, excess momentum energy of the return spring may generate a considerable torque peak which should be absorbed in order reliably to avoid mechanical damage to the drive device. Absorption of the momentum energy could be carried out by a swing-out of the components moved in each case. However, for a swing-out of the moved components, it is necessary to have space in the housing of the drive device. This space cannot be provided, since the drive device is intended to be installed in an internal combustion engine of a motor vehicle and therefore is to have a particularly low space requirement. A swing-out of the moved components of the gear of the drive device should therefore not be capable of being implemented via a momentum travel, but by means of components which are present in any case in the drive device. If, then, the actuating drive and the movable element are connected via a separating element, the excess momentum energy can be absorbed by means of this separating element. At the same time, however, it should be reliably ensured that the movable element continues to be capable of being activated in a particularly reliable way. An appropriate uncoupling medium for the separating element is elastic material which is arranged between the actuating drive and the movable element within the drive device. For this purpose, the gear has as separating element an additional lever arm which is designed in its end region approximately in the form of a tuning fork and, by virtue of its resilient action, absorbs excess momentum energy of the return spring when said lever arm is pivoted back by the return spring and comes to bear against the stop.

Advantageously, the free end of the first part region touches the free end of the second part region at at least one free point. By the free end of the first part region coming to bear against the free end of the second part region, the risk of additional deformation of the lever during the operation of the drive device is particularly low. At the same time, when the drive device is in operation, a uniform spring action of the lever is reliably ensured.

Advantageously, the lever has a second lever arm, on which a part toothed ring is arranged, the lever being capable of being driven by the gear via the part toothed ring of the second lever arm of the lever. A drive device can be constructed in a particularly space-saving way via gearwheels or part gearwheels. In this case, it proves sufficient to transmit the rotational movement of the suction pipe valve via a part toothed ring.

Advantageously, the current position of the lever is capable of being detected by a position detection device. In this case, the position detection device may be designed as a potentiometer, but, alternatively, also as a contactless sensor, for example as a magnetoresistive sensor or as a Hall sensor. By means of the position detection device, the in each case current position of the lever and therefore of the suction pipe valve can be additionally detected. As a result, even in the event of a failure of the actuating drive, the current position of the suction pipe valve is capable of being detected reliably.

Advantageously, the movable element is a suction pipe valve of a motor vehicle. A suction pipe valve which is capable of being driven by means of a drive device of this type has a particularly low space requirement and can therefore be arranged in a particularly space-saving way in the internal combustion engine of a motor vehicle.

Advantageously, the movable element is a throttle valve of a throttle valve connection piece, said throttle valve being arranged on a throttle valve shaft. By a drive device of the above-described type being used in a throttle valve connection piece, the latter has a particularly low space requirement and can therefore be arranged in a space-saving way in a motor vehicle.

Advantageously, a throttle valve connection piece with a housing which has a continuous throttle orifice through which a gaseous medium is capable of flowing, a throttle valve fastened pivotably to a throttle valve shaft being arranged in the throttle orifice, comprises, in the housing, a drive device of the abovementioned type. In this case, the throttle valve arranged on the throttle valve shaft is pivotable via the drive device. By virtue of the drive device of the abovementioned type, the throttle valve connection piece has a particularly low space requirement and, moreover, comprises components which have particularly low wear, thus reliably ensuring that the throttle valve connection piece has a particularly long useful life.

The advantages achieved by means of the invention are, in particular, that, on the one hand, the drive device requires a particularly small amount of space, and that, at the same time, even in the event of a sudden switch-off or failure of the actuating drive, the momentum energy of the return spring is capable of being reliably absorbed via the drive device.

BRIEF DESCRIPTION OF THE DRAWINGS

A first exemplary embodiment and a second exemplary embodiment are explained in more detail with reference to a drawing in which.

DETAILED DESCRIPTION OF THE PREFERRED EMBODIMENT

Parts corresponding to one another are given the same reference symbols in all the figures.

Figure 5:
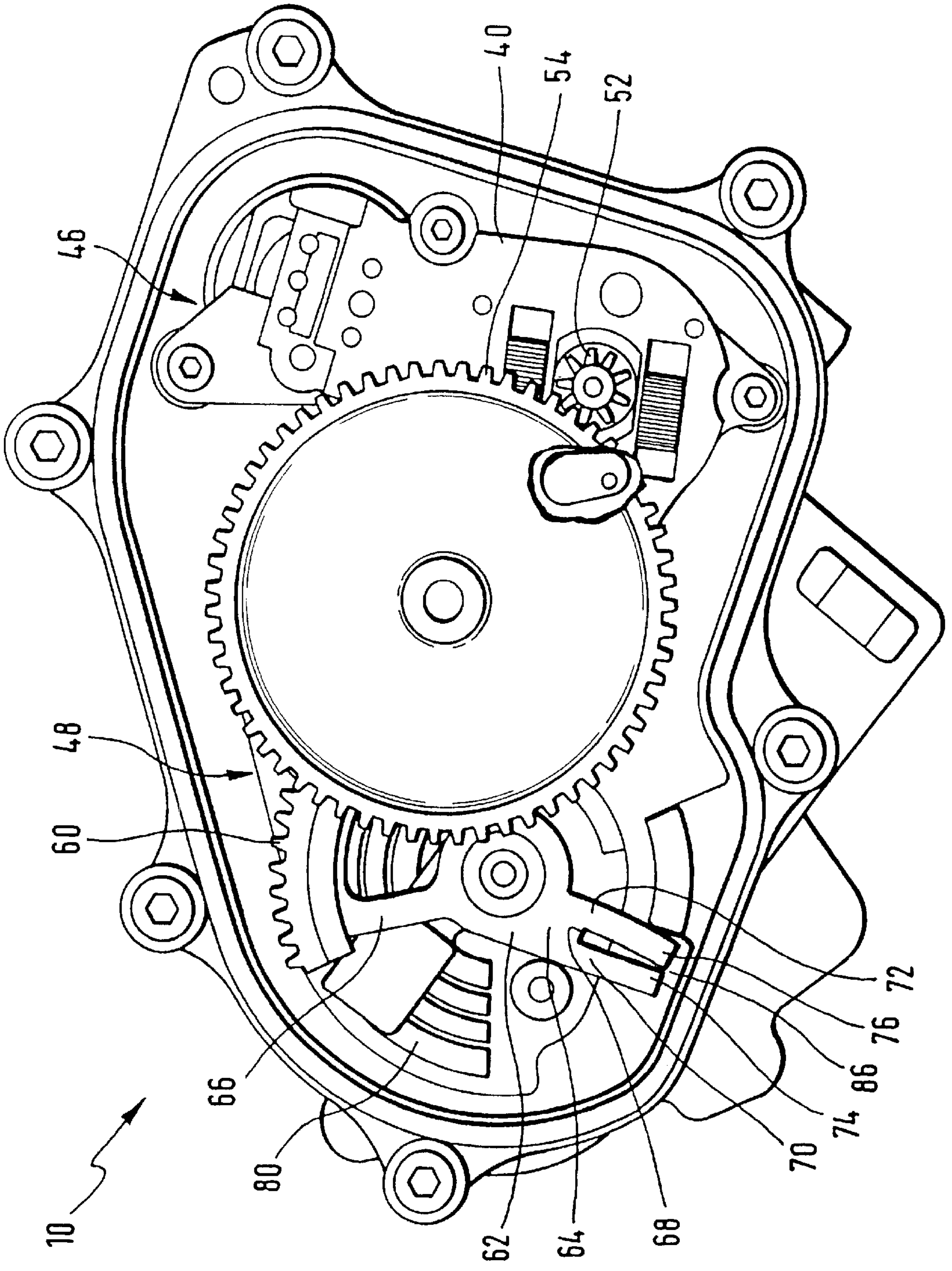
FIG. 5 shows diagrammatically the rear side of the drive device according to FIGS. 2 and 3 in a second design.
Figure 6:
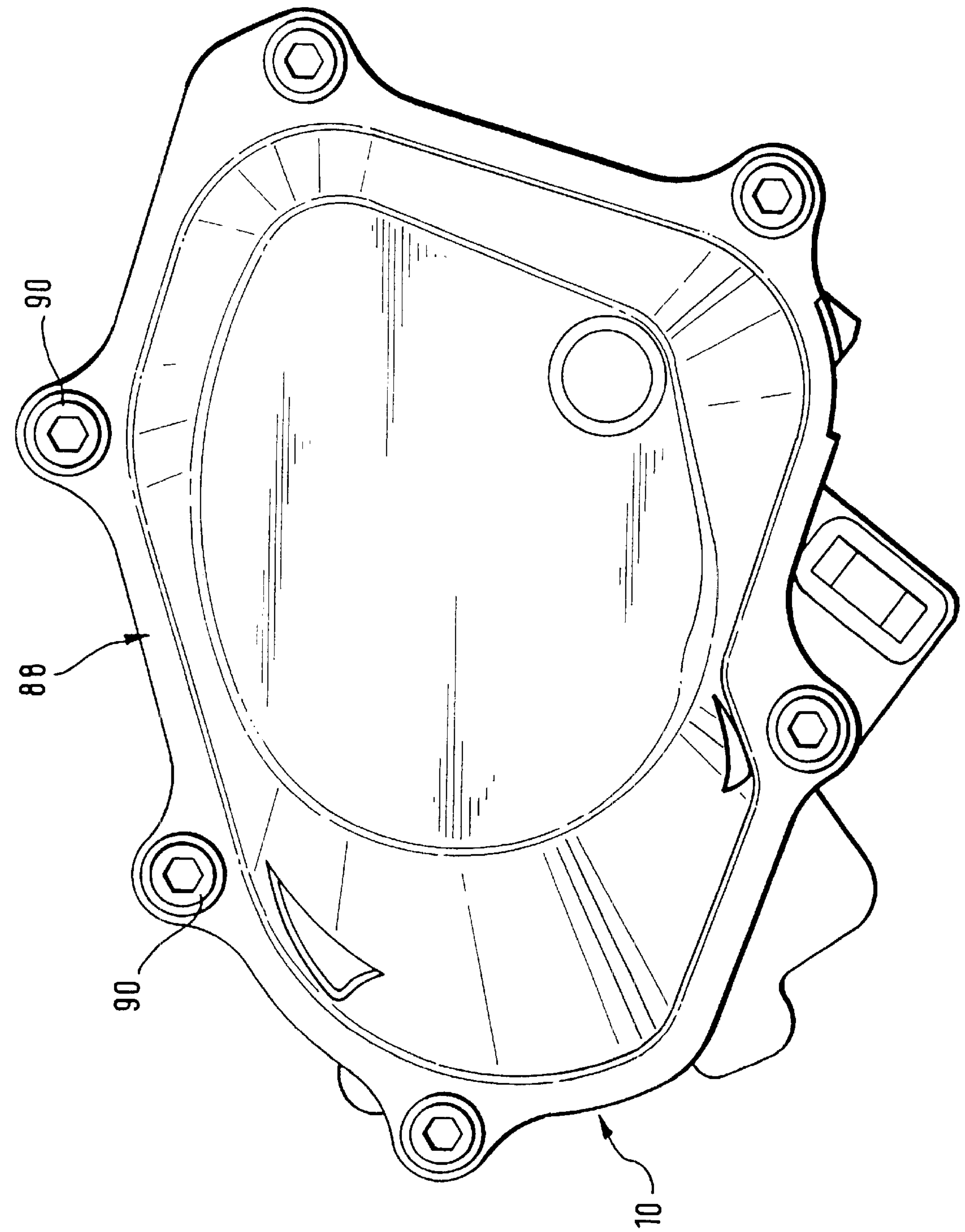
FIG. 6 shows diagrammatically the cover of the rear side of the drive device according to FIG. 5.
Figure 7:
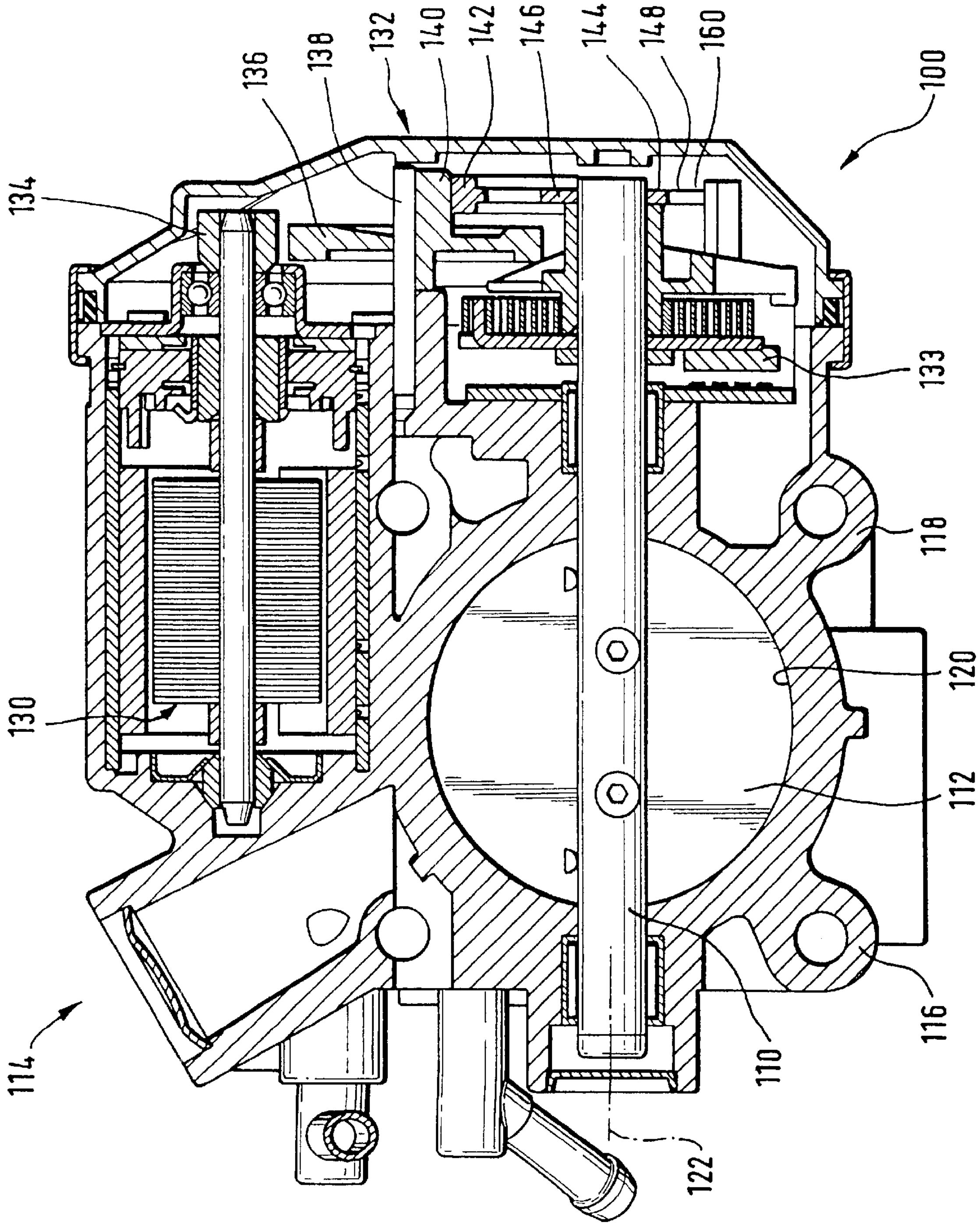
FIG. 7 shows diagrammatically a section through a throttle valve connection piece with a drive device for pivoting a throttle valve arranged on a throttle valve shaft.
Figure 8:
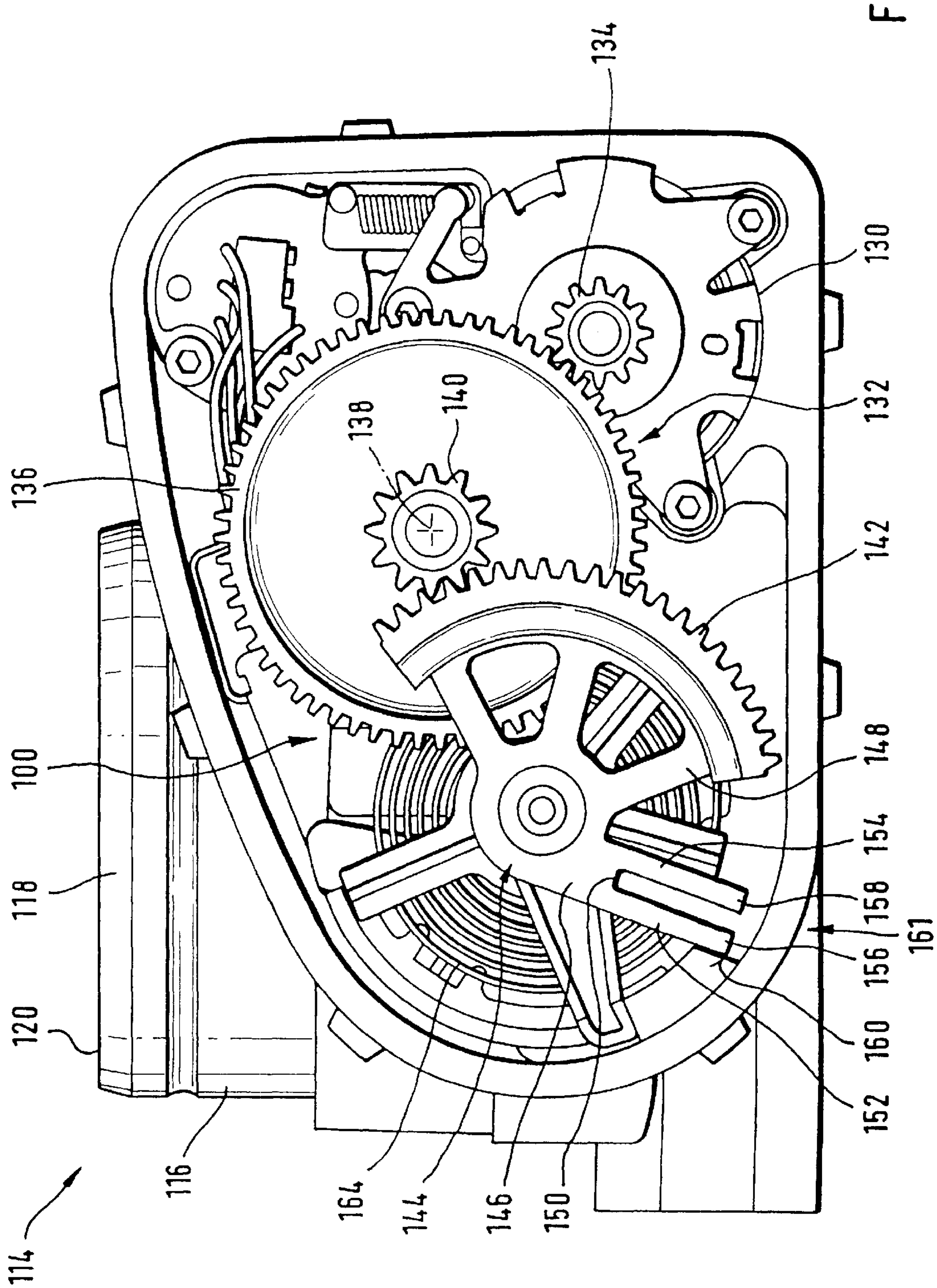
FIG. 8 shows diagrammatically a top view of the drive device of the throttle valve connection piece according to FIG. 7, with a nondeformed first lever arm of the lever.

FIGS. 1 to 6 explain a first exemplary embodiment, in which a drive device for driving a number of suction pipe valves is provided, and FIGS. 7 and 8 explain a second exemplary embodiment, in which a drive device is provided for pivoting a throttle valve of a throttle valve connection piece, said throttle valve being arranged on a throttle valve shaft.

Figure 1:
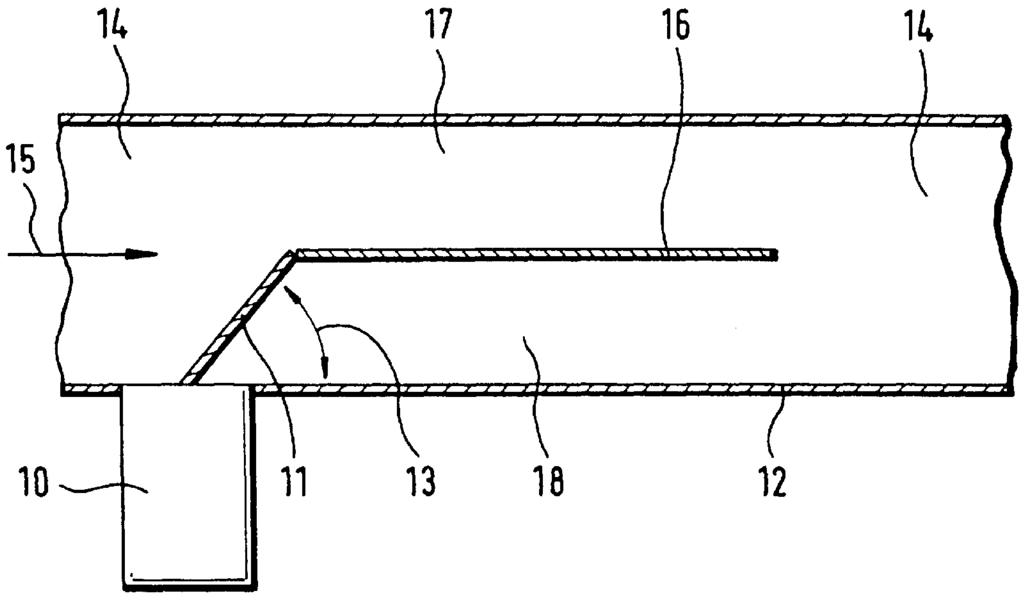
FIG. 1 shows diagrammatically a suction pipe with a suction pipe valve and with a drive device for adjusting the suction pipe valve.

The drive device 10 according to FIG. 1 is provided for driving a number of suction pipe valves 11, only one of which is illustrated diagrammatically in FIG. 1. The suction pipe valve 11 illustrated is arranged within a suction pipe 12 in such a way that the quantity of fresh gas 14 passing through the suction pipe 12 is capable of being set by means of an adjustment of the suction pipe valve 11 in the directions of the double arrow 13. The fresh gas 14 in this case flows through the suction pipe 12, illustrated only partially in FIG. 1, in a main flow direction 15 which extends from left to right according to FIG. 1. The fresh gas 14 is capable of being supplied to the suction pipe 12 via an air supply device not illustrated in any more detail in the drawing. The suction pipe 12 is connected on the outlet side to a combustion device, not illustrated in any more detail in the drawing, of an internal combustion engine of a motor vehicle.

The suction pipe valve 11 is arranged on a partition 16 of the suction pipe 12, said partition dividing the suction pipe 12 into a first part pipe region 17 and a second part pipe region 18. An adjustment of the suction pipe valve 11 in the directions of the double arrow 13 has the effect, in this case, that fresh gas 14 is capable of flowing, partially flowing or approximately not flowing at all through the part pipe region 18.

Figure 2:
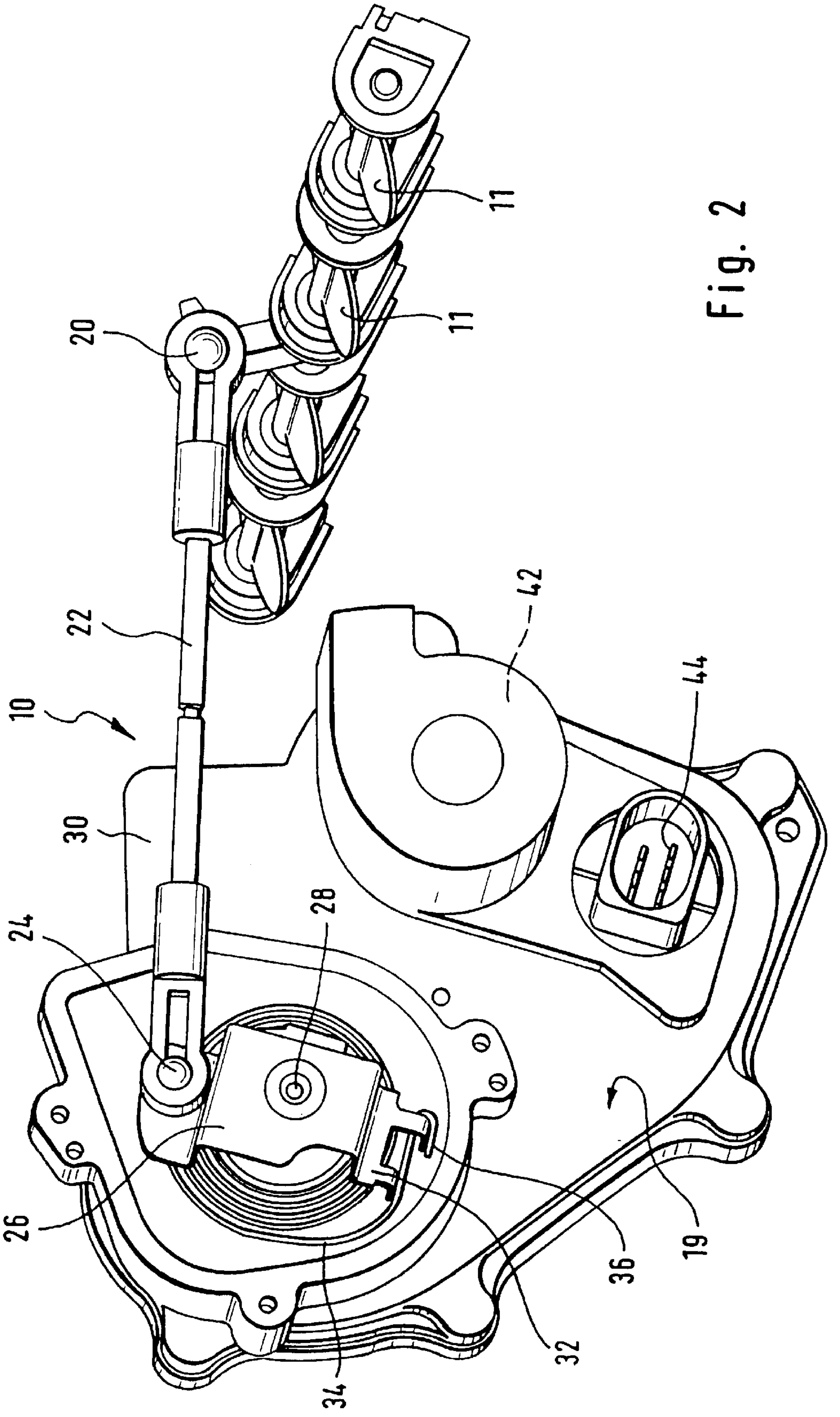
FIG. 2 shows diagrammatically the front side of the drive device for the adjustment of suction pipe valves.

The drive device 10 according to FIG. 1 is shown diagrammatically in detail in FIG. 2. FIG. 2 shows the front side 19 of the drive device 10. According to FIG. 2, a number of suction pipe valves 11 are capable of being adjusted jointly by the drive device 10. Alternatively, however, the suction pipe valves 11 may also be capable of being adjusted separately by virtue of a corresponding design of the drive device 10. The suction pipes 12 assigned in each case to the suction pipe valves 11 are not illustrated in any more detail in FIG. 2.

Figure 3:
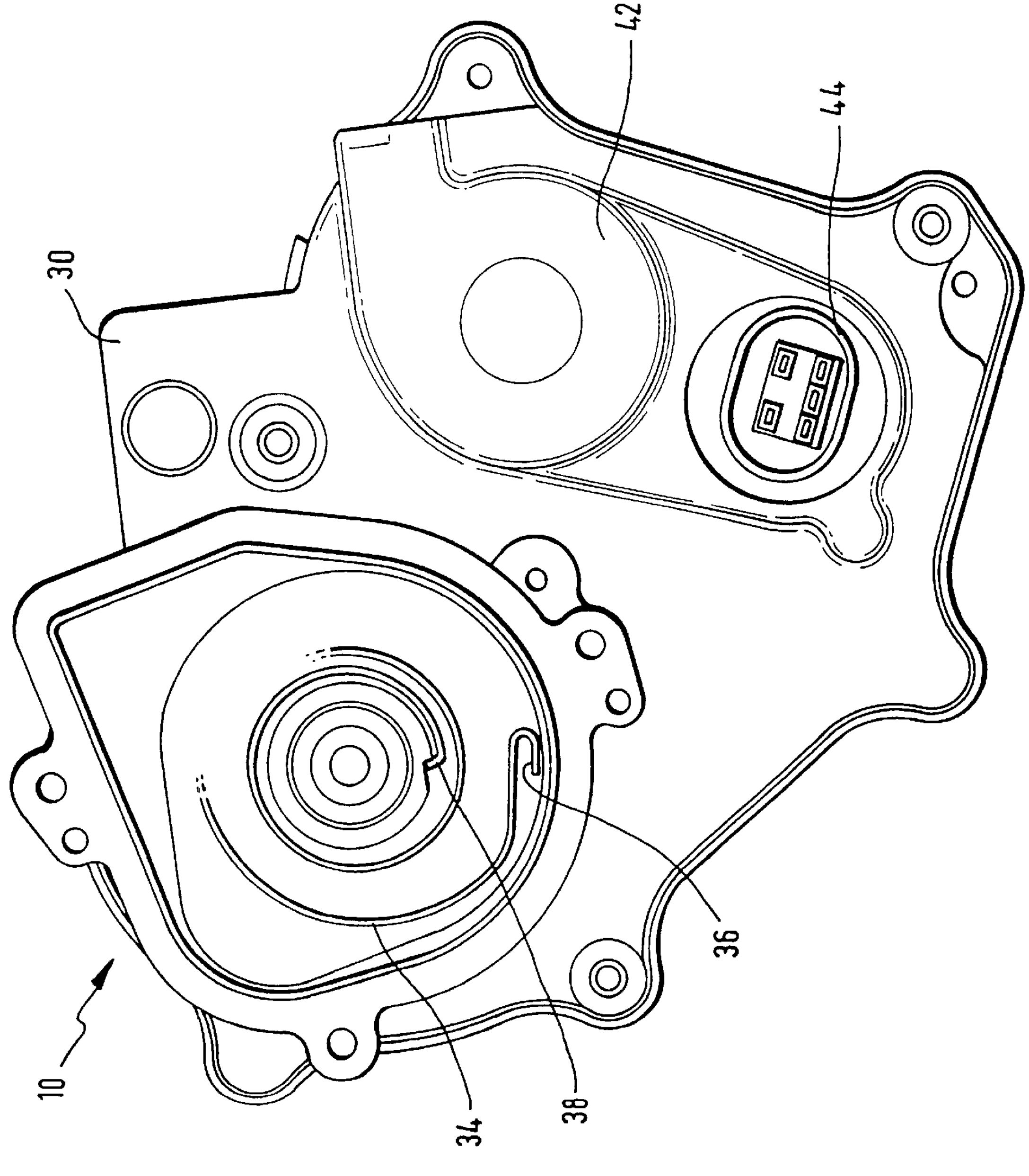
FIG. 3 shows diagrammatically the front side of the drive device for the adjustment of suction pipe valves.

The suction pipe valves 11 are connected to the drive device 10 via a first spherical gudgeon 20 and a push rod 22 and also a second spherical gudgeon 24. The second spherical gudgeon 24 is arranged rigidly on a rotary element 26, in such a way that, when the rotary element 26 rotates, the push rod 22 follows the rotational movement of the rotary element 26. For the rotation of the rotary element 26, the rotary element 26 is connected rigidly to a shaft 28 which is mounted rotatably in a housing 30. The material of the housing 30 in this case predominantly comprises metal, but may alternatively also comprise approximately completely plastic or plastic and metal. The rotary element 26 is connected, at its end 32 facing away from the second spherical gudgeon 24, to a flat coil spring 34. The flat coil spring 34 is connected at its first end to the rotary element 26 and at its second end 38 is connected firmly to the housing 30, as can be seen in FIG. 3. By the first end 36 of the flat coil spring 34 being connected to the rotary element 26, the rotary element 26 is acted upon by the flat coil spring 34 so as to be capable of being pivoted back into a basic position. The rotary element 26 is adjustable via an actuating drive 40 which is to be arranged in a clearance 42 of the housing 30. An electrical plug contact 44 is provided on the front side 18 of the housing 30 in order to apply current to the actuating drive 40.

FIG. 3 shows the front side 19 of the drive device 10, without the rotary element 26, so that both the first end 36 of the flat coil spring 34 and the suspension of the second end 38 of the flat coil spring 34 in a clearance of the housing 30 can be seen.

Figure 4:
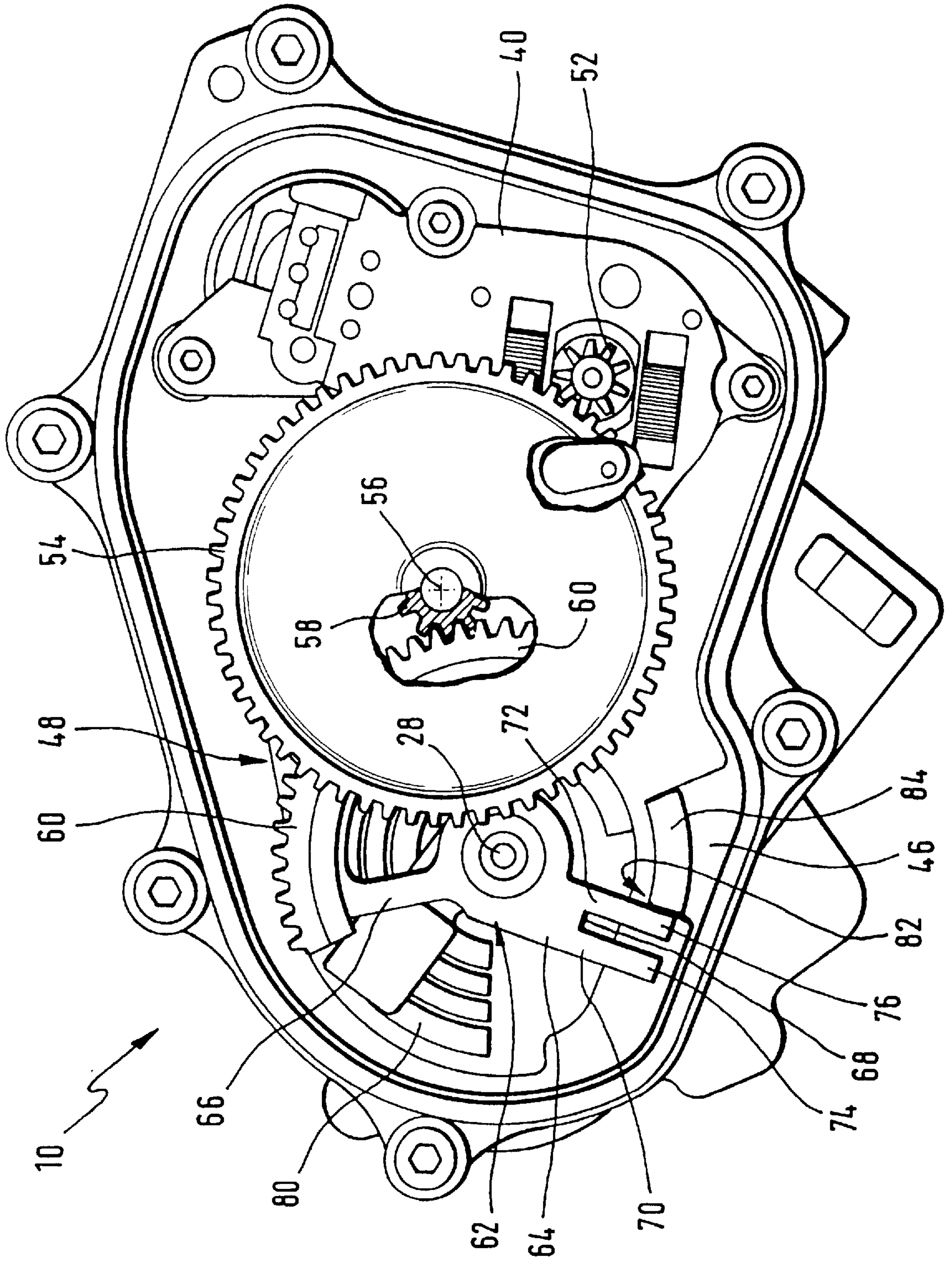
FIG. 4 shows diagrammatically the rear side of the drive device according to FIGS. 2 and 3 in a first design.

FIG. 4 shows diagrammatically the rear side 46 of the drive device 10 according to FIGS. 2 and 3. The actuating drive 40 is capable of driving a gear 48, via which the rotary element 26 is pivotable, with the result that, in turn, the suction pipe valves 11 are adjustable. The gear 48 comprises a motor pinion 52 and a gearwheel 54. The gearwheel 54 is in this case mounted rotatably in the housing 30 by means of an axle 56. The gearwheel 54 has on its rear side—the side facing away from the observer of FIG. 3—a gearwheel pinion 58. The gearwheel pinion 58 also belongs to the gear 48 and, in turn, is in engagement with a part toothed ring 60 likewise belonging to the gear 48. The part toothed ring 60 is arranged on a lever 62 which is assigned to the gear 48 and which is connected rigidly to the shaft 28, on which the rotary element 26 is also arranged rigidly according to FIG. 2. The lever 62 has a first lever arm 64 and a second lever arm 66. The part toothed ring 60 is arranged on the second lever arm 66 of the lever 62. The first lever arm 64 of the lever 62 has a clearance 68, by which the first lever arm 64 of the lever 62 is subdivided into a first part region 70 and a second part region 72.

The first part region 70 and the second part region 72 of the first lever arm 64 of the lever 62 each have a free end 74 and 76.

To detect the rotational movement of the rotary element 26 and of the lever 62 connected rigidly to the rotary element 26 via the shaft 28, the drive device 10 has a position detection device 80 designed as a potentiometer. The position detection device 80 designed as a potentiometer is connected, in a way not illustrated in any more detail, to the electrical plug contact 44 according to FIGS. 2 and 3.

FIG. 4 shows the first lever arm 64 of the lever 62 in the nondeformed state. The first lever arm 64 of the lever 62 is produced in the form illustrated according to FIG. 4 and is mounted in the drive device 10. In this case, according to FIG. 4, said first lever arm comes to bear, in its basic position 82, against a stop 84. The stop 84 is in this case connected firmly to the housing 30 and may be produced either in one piece with the housing 30, as in this exemplary embodiment, or alternatively also in two pieces with the housing 30. The first lever arm 64 of the lever 62 thus serves as transport protection from the completion of the drive device 10 until said drive device is mounted in the motor vehicle. The first lever arm 64 of the lever 62 in this case reliably prevents damage to the gear 48 when the lever is moved, as a result of external influences; away from the stop 84 against which it bears in its position of rest.

After the drive device has been installed in a motor vehicle, said drive device 10 is put into operation. When the drive device 10 has been put into operation, the lever 62 is moved into a position of maximum deflection. In this case, the motor pinion 52 of the actuating drive 40 moves clockwise. As a result of the clockwise rotational movement of the motor pinion 52, the gearwheel 54 moves counterclockwise. The gearwheel pinion 58 connected firmly to the gearwheel 54 also thereby moves counterclockwise. The gearwheel pinion 58, in turn, meshes with the part toothed ring 60 which moves clockwise as a result of the movement of the gearwheel pinion 58. The position of maximum deflection is in this case determined by the circumference of the part toothed ring 60. After a position of maximum deflection of the lever 62 is reached, during the setting of the drive device 10 the lever 62 is moved in such a way that it assumes a position of minimum deflection, in which the lever 62 does not bear against the stop 84. Then, when the drive device 10 is in operation, the lever 62 is moved back and forth between the positions of maximum and minimum deflection by means of the actuating drive 40, without the lever 62 at the same time coming to bear against the stop 84. A deflection of the lever 62 in the direction of a position of maximum deflection takes place, in this case, counter to the return force of the flat coil spring 34.

When the drive device 10 is in operation, then, the situation may arise where, because of a fault, the actuating drive 40 no longer receives any current, that is to say becomes dead. The result of this is that the flat coil spring 34 pivots back the rotary element 26 which it acts upon and consequently pivots back into its basic position 82 the lever 62 connected rigidly to the rotary element 26. Hence, in the event of a failure of the supply of current to the actuating drive 40, the lever 62 connected rigidly to the rotary element 26 via the shaft 28 moves back, driven by the spring force of the flat coil spring 34, into its basic position 82 in which the lever 62 is in bearing contact with the stop 84. The basic position 82 of the lever 62 is in this case defined by the stop 84. When the lever 62 butts against the stop 84, the first lever arm 64 of the lever 62 is deformed and at the same time consumes excess momentum energy of the flat coil spring 34.

This deformation of the first lever arm 64 of the lever 62 is shown in FIG. 5. It can be seen clearly how the second part region 72 touches with its free end 76 the free end 74 of the first part region 72 of the first lever arm 64 at a point 86. The thereby formed first lever arm 64 of the lever 62 has this deformation during the further operation of the drive device 10. This deformation of the first lever arm 64 of the lever 62 has the effect that, when the lever 62 and consequently the rotary element 26 are adjusted into the basic position 82 by means of the return force of the flat coil spring 34, excess momentum energy is absorbed by this resilient deformation of the first lever arm 64 of the lever 62. This spring action of the first lever arm 64 of the lever 62 has the effect that the teeth of the part toothed ring 60 remain in engagement with the gearwheel pinion 58 and do not break off under normal circumstances. This spring action of the first lever arm 64 of the lever 62 is maintained even when the actuating drive 40 is put into operation again and in the event of a renewed failure of the actuating drive 40.

The rear side 46 of the drive device 10 is capable of being closed by a cover 88 which, according to FIG. 6, is capable of being placed onto the rear side 46 of the drive device 10. The six fastening points 90 of the cover 86 can be seen clearly, by means of which the latter is capable of being fastened to the housing 30 of the drive device 10 by fastening means not illustrated in any more detail.

The advantages achieved by means of this first exemplary embodiment are, in particular, that, due to the special design of the first lever arm 64 of the lever 62, momentum energy of the rotary element 26 and consequently of the lever 62 is capable of being absorbed reliably in the event of a failure of the actuating drive 40, without damage to the drive device 10 occurring. At the same time, a particularly low space requirement of the drive device 10 is ensured.

Alternatively, a comparable drive device 10 may also be used in a throttle valve connection piece.

FIGS. 7 and 8 explain a second exemplary embodiment, in which the drive device 100 is provided for driving a throttle valve 112 of a throttle valve connection piece 114, said throttle valve being arranged on a throttle valve shaft 110.

The throttle valve connection piece 114 according to FIG. 7 serves for supplying an air or a fuel/air mixture to a consumer, not illustrated, for example an injection device of a motor vehicle, likewise not illustrated, the fresh gas quantity to be supplied to the consumer being capable of being controlled by means of the throttle valve connection piece 114. For this purpose, the throttle valve connection piece 114 has a housing 116 which is manufactured predominantly from metal 118, in particular aluminum, and has been produced by the injection molding method. Alternatively, however, the housing 116 may also be manufactured completely from plastic. The housing 116 has a throttle orifice 120, via which an air or a fuel/air mixture is capable of being supplied to the consumer, not illustrated. To set the volume of fresh gas to be supplied, a throttle valve 112 is arranged on a throttle valve shaft 110. A rotation of the throttle valve shaft 110 about its axis of rotation 122 gives rise simultaneously to a pivoting of the throttle valve 112 arranged on the throttle valve shaft 110, with the result that the active cross section of the throttle orifice 120 is increased or reduced. By means of an increase or a reduction in the active cross section of the throttle orifice 120 by the throttle valve 112, a regulation of the throughput of the air or fuel/air mixture through the throttle orifice 120 of the throttle valve connection piece 114 takes place.

The throttle valve shaft 110 may be connected to a rope pulley, not illustrated in any more detail, which, in turn, is connected via a Bowden cable to a setting device for a power requirement. The setting device may in this case be designed as the accelerator pedal of a motor vehicle, so that an actuation of this setting device by the driver of the motor vehicle can bring the throttle valve 112 from a position of minimum opening, in particular a closing position, into a position of maximum opening, in particular an open position, in order thereby to control the power output of the vehicle.

In contrast to this, the throttle valve shaft 110, shown in FIG. 7, of the throttle valve connection piece 114 is capable of being set in a part range by an actuating drive and otherwise via the accelerator pedal or else the throttle valve 112 is capable of being set over the entire adjustment range by an actuating drive. In these what are known as E-gas or drive-by-wire systems, the mechanical power control, for example the depression of an accelerator pedal, is converted into an electrical signal. This signal is supplied, in turn, to a control unit which generates an activation signal for the actuating drive. In these systems, during normal operation, there is no mechanical coupling between the accelerator pedal and the throttle valve 112.

To adjust the throttle valve shaft 110 and consequently the throttle valve 112, therefore, the throttle valve connection piece 114 has a drive device 100 which is arranged in the housing 116 of the throttle valve connection piece 114. The drive device 100 is shown in section in FIG. 7 and in a top view in FIG. 8.

The drive device 100 is arranged in the housing 116 of the throttle valve connection piece 114 and comprises an actuating drive 130 designed as an electric motor. The actuating drive 130 designed as an electric motor moves the throttle valve shaft 110 via a gear 132 designed as a reduction gear. The gear 132 also belongs to the drive device 100. The actuating drive 130 is connected in a way not illustrated in any more detail to a current source arranged outside the throttle valve connection piece 114 and to a control unit. The control unit transmits to the actuating drive a signal, by means of which the actuating drive 130 brings about a defined position of the throttle valve shaft 110 via the gear 132 designed as a reduction gear. The actual position of the throttle valve shaft 110 is capable of being detected via a position detection device 133 which is designed as a potentiometer and in which the slider of the position detection device 133 designed as a potentiometer is connected in a way not illustrated in any more detail to the throttle valve shaft 110.

To transmit a rotational movement from the actuating drive 130 designed as an electric motor to the throttle valve shaft 110, the gear 132 designed as a reduction gear comprises a motor pinion 134 which is connected in a rotationally rigid manner to the drive shaft, not illustrated in any more detail in the drawing, of the actuating drive 130 designed as an electric motor. The motor pinion 134 meshes with a gearwheel 136 which likewise belongs to the gear 132 and which is arranged rotatably on an axle 138 in the housing 116 of the throttle valve connection piece 114. The gearwheel 136 has a pinion 140 which likewise belongs to the gear 132 and which is connected in a rotationally rigid manner to the gearwheel 136. The pinion 140 meshes with a part toothed ring 142 which is likewise assigned to the gear. The gear 132 comprises, furthermore, a lever 144 with a first lever arm 146 and with a second lever arm 148. The part toothed ring 142 is arranged on the second lever arm 148 of a lever 144. The first lever arm 146 of the lever 144 has a clearance 150 which subdivides the first lever arm 146 of the lever 144 into a first part region 152 and a second part region 154. The first part region 152 has a free end 156 and the second part region 154 has a free end 158. The first part region 152 of the first lever arm 146 of the lever 144 bears with its free end 156 against a stop 160 fixed to the housing. This position of the lever 144 is its basic position 161.

The lever 144 is connected in a rotationally rigid manner to the throttle valve shaft 110. Furthermore, the throttle valve shaft 110 has connected to it a first end 162 of a flat coil spring 164, the second end 166 of which is connected firmly to the housing 116. The flat coil spring 164 is designed in such a way that the first lever arm 146 of the lever 144 is capable of being moved counterclockwise away from the stop 160 by means of the actuating drive 130 via the gear 132 solely counter to the force of the flat coil spring 164. The flat coil spring 164 is also to be assigned to the drive device 100.

FIG. 8 shows the first lever arm 146 of the lever 144 in the nondeformed state, bearing against a stop 160 fixed to the housing. With the lever 144 in this position, the throttle valve 112 only partially closes the throttle orifice 120 of the throttle valve connection piece 114. The lever 144 is installed in this nondeformed state into the throttle valve connection piece 114. In order, then, to ensure that, when the first lever arm 146 of the lever 144 comes to bear against the stop, the throttle valve 112 assumes a position in which the throttle valve 112 closes the throttle orifice 120 approximately completely, the first lever arm 146 of the lever 144 is deformed before the throttle valve connection piece 114 is put into operation.

For this purpose, current is applied to the actuating drive 130 designed as an electric motor, in such a way that the motor pinion 134 rotates counterclockwise. This rotation of the motor pinion 134 brings about a clockwise rotation of the gearwheel 136, the pinion 140 also simultaneously rotating clockwise. The rotational movement of the pinion 140 has the effect that the part toothed ring 142 rotates counterclockwise and consequently the throttle valve shaft 110 and therefore the throttle valve 112 are rotated through approximately 90°. This corresponds to a position of maximum opening of the throttle valve 112 in the throttle orifice 120. The actuating drive 130 is then made dead. The result of this is that the throttle valve shaft 110 and consequently the lever 144 are rotated clockwise until the lever 144 comes to bear again with its first lever arm 146 against the stop 160. The result of this backward rotation of the throttle valve shaft 110 is that the first lever arm 146 is deformed when it butts against the stop 160 and then assumes the form shown in FIG. 9. During its deformation, the first lever arm 146 of the lever 144 absorbs excess momentum energy of the flat coil spring 164. The deformation of the first lever arm 146 of the lever 144 has the effect that the first part region 152 approximately touches with its free end 156 the second part region 154 with its free end 158 at a point 168. This deformation of the first lever arm 146 of the lever 144 gives rise to a resilient property of the first lever arm 146 of the lever 144. This resilient property of the first lever arm 146 of the lever 144 ensures reliably that, in the event of a failure of the actuating drive 130 and a resetting of the lever 144 by means of the return force of the flat coil spring 164, the gear 132 normally remains undamaged when the first lever arm 146 of the lever 144 comes into bearing contact with the stop 160. To be precise, even when the lever 144 subsequently flies back against the stop 160, the resilient property of the first lever arm 146 of the lever 144 absorbs excess momentum energy of the flat coil spring 164.

Figure 9:
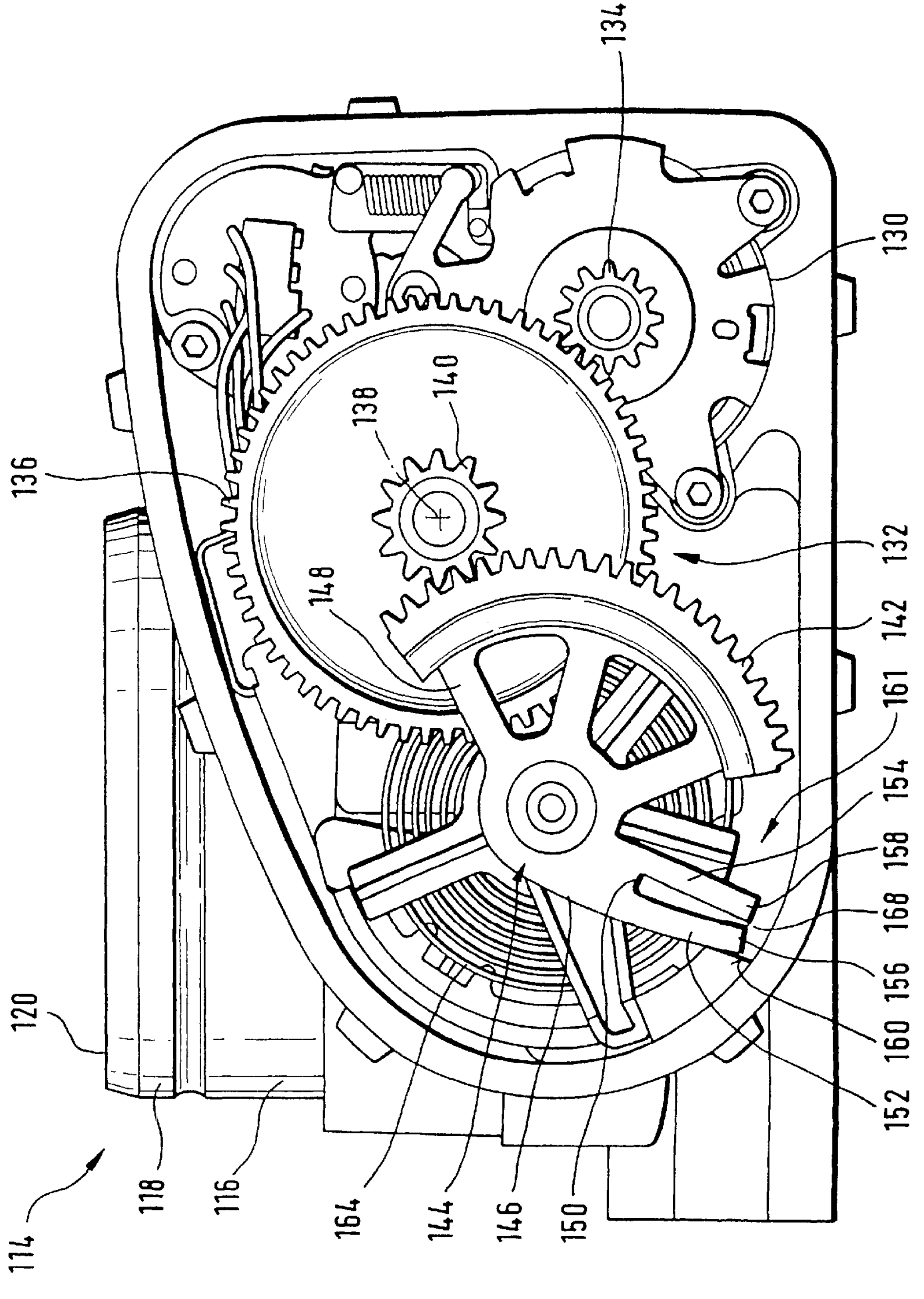
FIG. 9 shows diagrammatically the top view of the drive device of the throttle valve connection piece according to FIG. 7, with a deformed first lever arm of the lever.

When the throttle valve 112 closes the throttle orifice 120 approximately completely, the first lever arm 146 of the lever 144 bears against the stop 160 in the deformed state according to FIG. 9. By means of the actuating drive 130, the lever 144 is capable of being rotated via the gear 132 counter to the force of the flat coil spring 164 and consequently causes the throttle valve 112 at least partially to open the throttle orifice 120 of the throttle valve connection piece 114. In the event of a failure of the actuating drive 132, the return force of the flat coil spring 164 has the effect that the lever 144 comes to bear with its second lever arm 146 against the stop 160. Excess momentum energy of the flat coil spring 164 is in this case reliably absorbed by virtue of the resilient property of the deformed first lever arm 146 of the lever 144 according to FIG. 9, in such a way that damage to the gear 132 caused by the backward rotation of the lever 144 is virtually ruled out. Moreover, the first lever arm 146 of the lever 144 not only reliably prevents damage to the gear 132 when the throttle valve connection piece is in operation, but also exerts its protective action for the gear 132 when the throttle valve connection piece is transported as a component from one place to another.

We claim:

1. A drive device (10, 100) with an actuating drive (40, 130) for driving a movable element (11, 110), in said drive device a lever (62, 144) coupled to the movable element (11, 110) is driveable by the actuating drive (40, 130) via a gear (48, 132), the lever (62, 144) being acted upon by a firmly supported return spring (34, 164) so as to be pivotable back into a basic position (82, 161), and, in the basic position (82, 161), a first lever arm (64, 146) of the lever (62, 144) being acted upon by a stop (84, 160), wherein the first lever arm (64, 146) is subdivided by a clearance (68, 150) into a first part region (70, 152) and a second part region (72, 154), the first part region (70, 152) and the second part region (72, 154) each having a free end (74, 76, 156, 158), and at least the free end (76, 158) of the second part region (72, 154) being deformed in direction of the free end (74, 156) of the first part region (70, 152).

2. The drive device (10, 100) as claimed in claim 1, wherein the free end (74, 156) of the first part region (70, 152) touches the free end (76, 158) of the second part region (72, 154) at at least one point (86, 168).

3. The drive device (10, 100) as claimed in claim 1, wherein the lever (62, 144) has a second lever arm (66, 148), on which a partly toothed ring (60, 142) is arranged, the lever (62, 144) being driveable by the gear (48, 132) via the partly toothed ring (60, 142) of the second lever arm (66, 148) of the lever (62, 144).

4. The drive device (10, 100) as claimed in claim 1, further camp sing a position detection device (80, 133) for detecting current position of the lever (62, 144).

5. The drive device (10) as claimed in claim 1, wherein the movable element (11) is a suction pipe valve (11).

6. The drive device (100) as claimed in claim 1, wherein the movable element (110) is a throttle valve shaft (110) of a throttle valve connection piece (114).

7. A throttle valve connection piece (114) comprising a housing (116) which has a continuous throttle orifice (120), a throttle valve (112) fastened pivotably to a throttle valve shaft (110) being arranged in the throttle orifice (120), the throttle valve shaft (110) being pivotable by a drive device (100) arranged in the housing (116), wherein the drive device (100) is formed as claimed in claim 1.

8. A throttle valve connection piece (114) comprising a housing (116) which has a continuous throttle orifice (120), a throttle valve (112) fastened pivotably to a throttle valve shaft (110) being arranged in the throttle orifice (120), the throttle valve shaft (110) being pivotable by a drive device (100) arranged in the housing (116), wherein the drive device (100) is formed as claimed in claim 3.

9. A throttle valve connection piece (114) comprising a housing (116) which has a continuous throttle orifice (120), a throttle valve (112) fastened pivotably to a throttle valve shaft (110) being arranged in the throttle orifice (120), the throttle valve shaft (110) being pivotable by a drive device (100) arranged in the housing (116), wherein the drive device (100) is formed as claimed in claim 3.

10. A throttle valve connection piece (114) comprising a housing (116) which has a continuous throttle orifice (120), a throttle valve (112) fastened pivotably to a throttle valve shaft (110) being arranged in the throttle orifice (120), the throttle valve shaft (110) being pivotable by a drive device (100) arranged in the housing (116), wherein the drive device (100) is formed as claimed in claim 4.

* * * * *